United States Patent
Gendel

(10) Patent No.: US 6,608,821 B1
(45) Date of Patent: Aug. 19, 2003

(54) METHOD FOR COLLISION AVOIDANCE IN AN ASYNCHRONOUS COMMUNICATION SYSTEM

(75) Inventor: Alon Gendel, Ra'anana (IL)

(73) Assignee: Texas Instruments Israel Ltd., Kfar Saba (IL)

( * ) Notice: Subject to any disclaimer, the term of this patent is extended or adjusted under 35 U.S.C. 154(b) by 0 days.

(21) Appl. No.: 09/196,957

(22) Filed: Nov. 20, 1998

(51) Int. Cl.$^7$ .................................................. H04J 3/00
(52) U.S. Cl. ........................ 370/280; 370/345; 370/458; 370/468
(58) Field of Search .................................. 370/280, 281, 370/347, 295, 294, 301, 302, 326, 330, 336, 344, 345, 395.4, 436, 442, 461, 468, 498, 539, 458

(56) References Cited

U.S. PATENT DOCUMENTS

| | | | | |
|---|---|---|---|---|
| 4,641,304 A | * | 2/1987 | Raychaudhuri | 370/447 |
| 5,155,469 A | | 10/1992 | Hartmann et al. | |
| 5,295,140 A | * | 3/1994 | Crisler et al. | 370/443 |
| 5,303,234 A | * | 4/1994 | Kou | 370/442 |
| 5,377,192 A | * | 12/1994 | Goodings et al. | 370/348 |
| 5,390,181 A | * | 2/1995 | Campbell et al. | 370/444 |
| 5,577,024 A | * | 11/1996 | Malkamaki et al. | 370/18 |
| 5,615,212 A | * | 3/1997 | Ruszczyk et al. | 370/443 |
| 5,960,000 A | * | 9/1999 | Ruszczyk et al. | 370/447 |
| 6,058,137 A | * | 5/2000 | Partyka | 375/201 |
| 6,249,540 B1 | * | 6/2001 | Dicker et al. | 375/133 |
| 6,292,493 B1 | * | 9/2001 | Campbell et al. | 370/445 |
| 6,445,701 B1 | * | 9/2002 | Bahl | 370/368 |

OTHER PUBLICATIONS

Dill, J.C. "A Minislot Access Protocol for CDMA Packet Radio Networks with Positive Acknowledgement." Military Communications Conference, Oct. 15–18, 1989, vol. 1, pp. 161–165.*

Wen, Jyh–Horng et al "A New Protocol for Wireless Voice Communications—Non–Collision Packet Reservation Multiple Access." Personal, Indoor and Mobile Radio Communications, Sep. 27–29, 1995, vol. 2, pp. 638–642.*

* cited by examiner

Primary Examiner—Hassan Kizou
Assistant Examiner—Anh-Vu H. Ly
(74) Attorney, Agent, or Firm—Howard Zaretsky

(57) ABSTRACT

A method of avoiding collisions among a plurality of transmitters that communicate asynchronously in relation to each other with a single receiver. The transmission scheme utilizes a randomization process to minimize the probability of collision among transmitted signals from different non synchronized transmitters, thus achieving improved overall link quality for each transmitter and improved system performance. The method has applications to many types of communications systems including frequency hopping spread spectrum communications systems. Transmitters send data in a burst of data packets, each sent during a time slot within the burst. Each time slot is divided into two or more sub time slots. During each time slot, one of the sub time slots is randomly chosen and the data packet is transmitted during that particular sub time slot. The larger the number of sub time slots used results in lower probability of complete transmission loss.

16 Claims, 4 Drawing Sheets

METHOD FOR COLLISION AVOIDANCE IN AN ASYNCHRONOUS COMMUNICATION SYSTEM

FIELD OF THE INVENTION

The present invention relates generally to communication systems and more particularly relates to a method of avoiding collisions among multiple transmitters in an asynchronous communications system.

BACKGROUND OF THE INVENTION

Currently, high frequency radio frequency (RF) communications is becoming more and more prevalent in the world. Products touting wireless RF communication links are becoming increasingly popular among consumers. Today, there are an increasing number of new products, including redesigned existing ones, being designed that incorporate wireless RF links.

Many of today's applications of RF wireless technology require low cost solutions. Products are designed with extraneous components eliminated from the final product. In numerous applications, it is necessary to communicate data from one point to another but in a unidirectional rather than bidirectional manner. For example, a device may be able to transmit but not receive, i.e., it cannot receive acknowledgements of its transmissions. Notwithstanding this, it is desirable to still be able to reliably communicate between the transmitter and the receiver. In addition, many applications include a plurality of transmitters communicating asynchronously with each other to a single receiver.

To achieve reliable communications, techniques have been developed which increase the odds of successful communications. For example, one technique is to repeat the same message a particular number of times. Even if interference prevents the reception of one or more of the messages, it is not likely that every transmission of the repeated message will be prevented from being received.

The problem, however, is compounded in certain types of multiple transmitter communication systems. For example, a problem exists in frequency hopping spread spectrum and other types of systems wherein all the transmitters begin transmitting bursts of data packets asynchronously with respect to each other. It is entirely possible that two transmitters may begin transmissions at nearly the same time.

If the transmitters in the system utilize different pseudo random hop sequences, than the problem is less severe. If the transmitters in the system utilize the same hop sequence, and same hop time, however, then it is possible that two transmitters will begin transmission at nearly the exact same time and interfere with each other throughout all transmissions (on all frequencies). The occurrence of this could cause complete loss of the transmitted data. Thus, the overall link quality of the communication system can be enhanced by a transmission arrangement that minimizes the chance of collision of transmissions from asynchronous multiple transmitters.

SUMMARY OF THE INVENTION

The present invention comprises a method of avoiding collisions among a plurality of transmitters that communicate asynchronously in relation to each other with a single receiver. The transmission arrangement of the present invention utilizes a randomization process to minimize the probability of repeated collisions among transmitted signals from different non synchronized transmitters, thus achieving improved overall system performance.

The method of the present invention has applications to many types of communications systems, in particular, frequency hopping spread spectrum communications systems. The invention has utility in any application where a message is communicated by repeatedly transmitting the message a multiple number of times in order to increase the reliability of reception.

To aid in illustrating the principles of the present invention, the following description is presented within the context of a frequency hopping spread spectrum communication system. The scope of present invention, however, is not limited to such an application. One skilled in the art can apply the principles of the present invention to numerous other types of communications systems as well.

The invention comprises a plurality of transmitters wherein each transmitter transmits data in a burst of data packets, each data packet sent during a separate time slot within the burst. Further, each time slot comprises two or more sub time slots. During each time slot, one of the sub time slots is randomly chosen and the data packet is transmitted during that particular time. A larger number of sub time slots used results in a lower probability of collision and complete transmission loss. By randomizing the timing of the transmission of the data packets among the plurality of sub time slots, the chances of collisions in all time slots throughout the burst is greatly reduced.

There is provided in accordance with the present invention, in a communications system consisting of a plurality of transmitters and at least one receiver, each the transmitter including means for initiating and transmitting a message to the at least one receiver, a method of transmitting the message, the method comprising the steps of transmitting the message a predetermined number of times N, each message transmission occurring during a time slot thus yielding a burst consisting of N time slots, subdividing each time slot into a plurality of M sub time slots, randomly transmitting the message during one of the M sub time slots while not transmitting during the remaining M−1 time slots and wherein N is a positive integer and M is equal to or greater than 2. The method further comprises the step of appending a gap time to the initial portion of each the time slot before the plurality of sub time slots.

There is also provided in accordance with the present invention, in a frequency hopping spread spectrum communications system consisting of a plurality of transmitters and at least one receiver, each the transmitter including means for initiating and transmitting a message to the at least one receiver, each transmitter utilizing the same pseudo random hop sequence of N frequencies, a method of avoiding collisions between transmission signals, the method comprising the steps of transmitting the message N times, each message transmission occurring during a time slot wherein each time slot is assigned a different frequency, subdividing each time slot into a plurality of M sub time slots, randomly transmitting the message during one of the M sub time slots while not transmitting during the remaining M−1 time slots and wherein N is a positive integer and M is equal to or greater than 2.

BRIEF DESCRIPTION OF THE DRAWINGS

The invention is herein described, by way of example only, with reference to the accompanying drawings, wherein.

DETAILED DESCRIPTION OF THE INVENTION

The present invention is a method of avoiding collisions among a plurality of transmitters that transmit asynchronously in relation to each other to a single receiver. The transmission arrangement of the present invention utilizes a randomization process to minimize the probability of collision among transmitted signals from different non synchronized transmitters, resulting in improved overall link quality for each transmitter. The method of the present invention has applications to many types of communications systems including frequency hopping spread spectrum communications systems. To aid in illustrating the principles of the present invention, the following description is presented within the context of a frequency hopping spread spectrum communication system. The scope of present invention, however, is not limited to only such an application. One skilled in the art can apply the principles of the present invention to numerous other types of communications systems as well.

Figure 1:
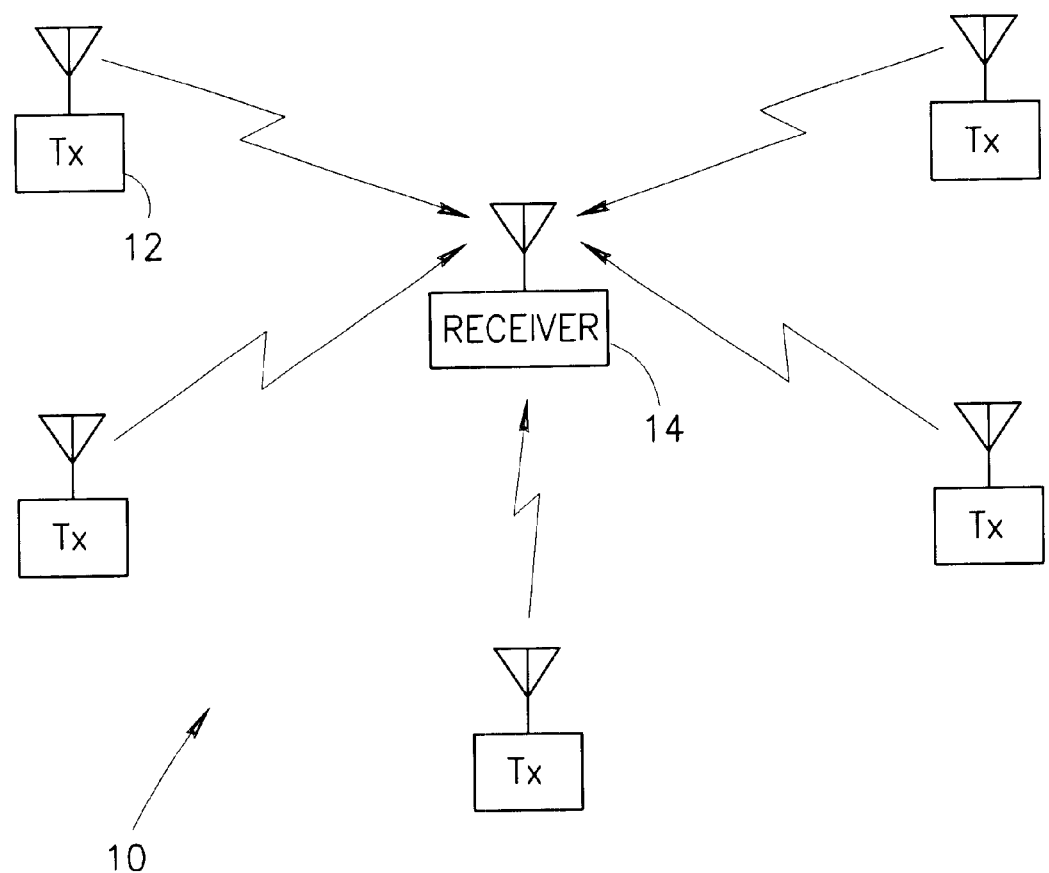
FIG. 1 is a block diagram illustrating an example communications system wherein multiple transmitters communicate asynchronously with a single receiver.

A block diagram illustrating an example communications system wherein multiple transmitters communicate asynchronously with a single receiver is shown in FIG. 1. The example communications system, generally referenced 10, is a frequency hopping spread spectrum communication system. The system 10 comprises a plurality of remote transmitters 12 and one or more receivers 14. The remote transmitters are capable of transmitting only and therefore cannot receive acknowledgements of the reception of their transmissions.

In a frequency hopping system, the frequency of transmission is changed in some fashion in a way known to both transmitter and receiver. The frequency hopping range is defined and a number of frequencies are selected as hop frequencies. Typically a pseudo random sequence is used to determine the hop sequence. During communications, a transmitter and the receiver synchronously hop from frequency to frequency in accordance with the hop sequence known to both of them. If multiple transmitters exist, each may use the same or a different hop sequence. In the example presented herein, all transmitters use the same hop sequence.

Figure 2:
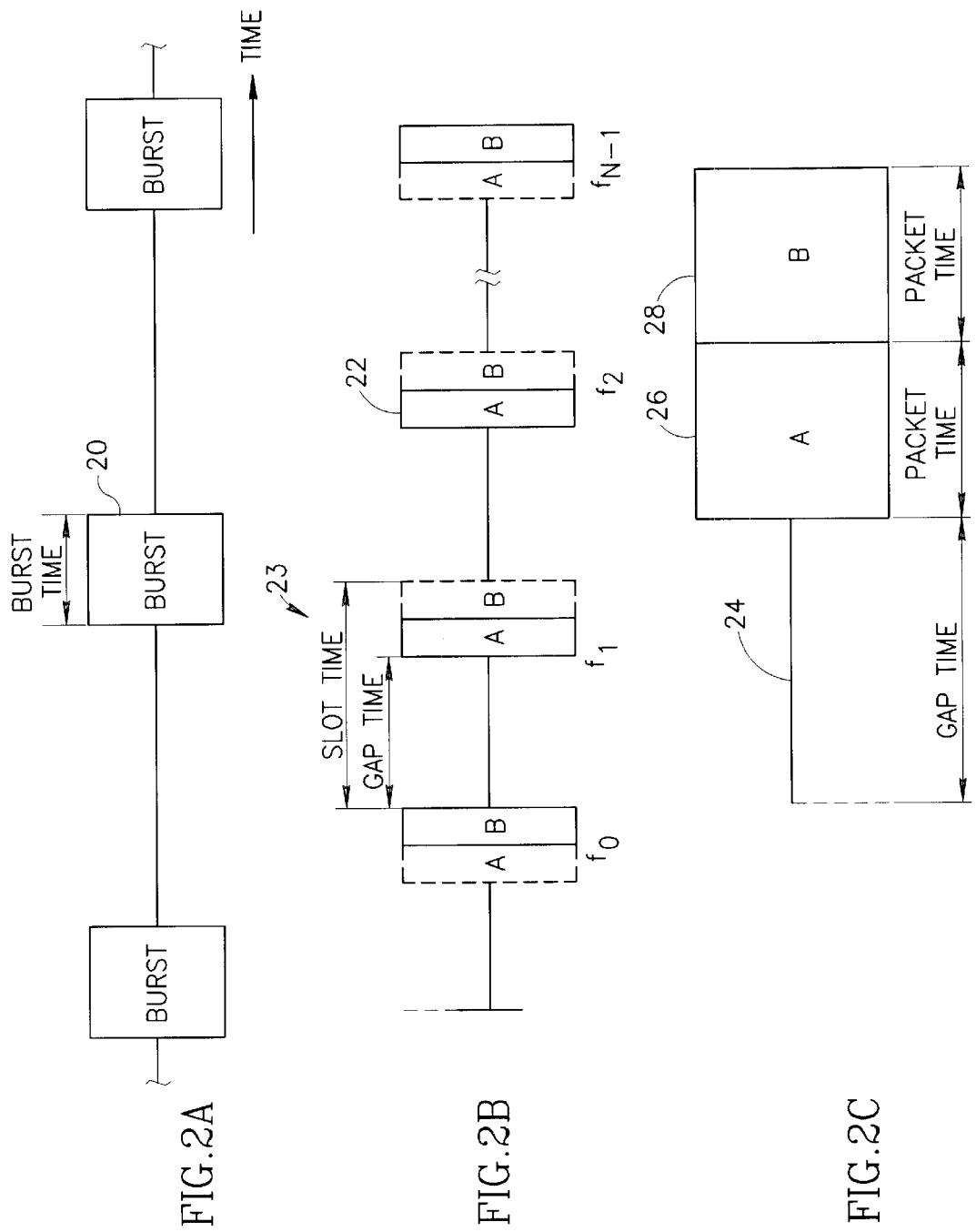
FIG. 2A is an illustration representing an example sequence of bursts of data from a single transmitter.
FIG. 2B is an illustration representing a plurality of time slots making up a single burst.
FIG. 2C is an illustration of a single time slot shown in more detail constructed in accordance with the present invention.

A transmission is defined as a burst of a plurality of packets comprising data. This is shown in FIG. 2A which is an illustration representing an example sequence of bursts of data from a single transmitter. Each burst of a plurality of packets 20 from a single transmitter is output at random timing with respect to the previous burst. Reference is now made to FIG. 2B that illustrates a plurality of time slots making up a single burst. Each burst is comprised of a plurality of N single packet data transmissions. Each single packet data transmission occurs within a time slot. A gap is placed between each two consecutive data packets. The burst 20 is comprised of a plurality of time slots 23. Each time slot comprises a gap time and a packet. Each data packet is transmitted utilizing a different frequency in accordance with the predefined hopping sequence known to the transmitters and receivers in the communication system.

Note that for each burst of packets, the same hop sequence is used, i.e., one hop per transmission. Each packet within the burst contains the same data. Thus, the same data packet is repeatedly sent N times in each burst. The receiver, upon detecting a packet of data, starts hopping in synchronization with the transmitter. Each packet is received using the frequency previously assigned to that time slot. The N frequencies used for each burst are labeled $f_0$ through $f_{N-1}$ wherein each frequency is associated with a different time slot. The multiple receptions can be characterized as a repetition code that provides a high degree of certainty as to the validity of the contents of the transmissions.

In addition, all the transmitters transmit asynchronously in time with respect to each other, therefore their transmission times are not synchronized. Two transmitters may start transmitting data at any time in relation to each other. Thus, it is possible that two transmitters begin their transmissions at exactly or nearly exactly the same time. When such a scenario occurs, the transmissions from the two transmitters interfere with each other. More specifically, the two transmission collide with each other on each and every frequency in each time slot and the contents of either one or both transmissions may be lost.

Without the benefit of the method of the present invention, when two transmitters begin transmitting at nearly or exactly the same time, their transmissions collide during each and every time slot causing the contents of one or both transmissions to be lost. The collision avoidance method of the present invention provides a randomization of the inter-packet gap times that are used by each transmitter. Each data packet is transmitted during either one of two adjacent, non-overlapping intervals relative to the previously transmitted data packet.

Thus, even if two transmitters begin transmitting at exactly the same time, each data packet has a probability of ½ of colliding with a data packet from the other transmitter. Thus, the overall probability Pr of losing a complete transmission burst is greatly reduced and can be expressed as shown in Equation 1 below.

$$Pr = \left(\frac{1}{2}\right)^N \quad (1)$$

Wherein N represents the number of frequencies in the hop sequence, which is the number of data packets transmitted in a single burst. Note that the receiver may start hopping synchronously with transmitter A at a frequency $f_k$ where k may or may not be equal to 0 (this occurs when one or more packets are not received for reasons related to reception rather than collisions), while transmitter B has begun transmitting its burst of data packets at exactly the same time transmitter A started transmitting. In this case, the probability Pr for all data packets from both transmitters to interfere with each other resulting in complete jamming of their transmissions is given below in Equation 2.

$$Pr = \left(\frac{1}{2}\right)^{N-k} \qquad (2)$$

In this case, the probability is higher than that expressed in Equation 1 by a factor of $(\frac{1}{2})^{-k}$ or $2^k$.

With reference to FIGS. 2A, 2B, 2C, the slot time ($T_{slot}$) 23 is made up of a gap time 24 ($T_{gap}$) and two sub time slots or packet times ($T_{packet}$) 26, 28 labeled A and B respectively. The data packet is sent during only one of the two packet times, i.e., either A or B. At the time of transmission, the transmitter randomly chooses either sub slot A or B in which to send the data packet. In the example transmission sequence shown in FIG. 2B, the data packet is sent during either sub time slot A or B. The non-chosen sub time slot is indicated by dashed lines. Note that in this frequency hopping spread spectrum example, each data packet is transmitted using a different frequency during each time slot.

The gap time $T_{gap}$ is optional and is not relevant to the operation of the present invention. In other words, the probability of collisions and the ability of the present invention to avoid collisions is not effected by the length of the gap time. Thus, the gap time $T_{gap}$ may be set to zero and the burst diagram illustrated in FIGS. 2B and 2C may be collapsed in accordance therewith.

The gap time may, however, be required for purposes of providing the transmitter and the receiver sufficient settling time to switch from one frequency to another as is typically the case in a frequency hopping spread spectrum communication system. In addition, the gap time may be needed by the receiver in order to have sufficient time in making a majority decision and for other required processing tasks. As an example, the gap time may be 4 ms and the sub time slots may be 1 ms wide.

Figure 3:
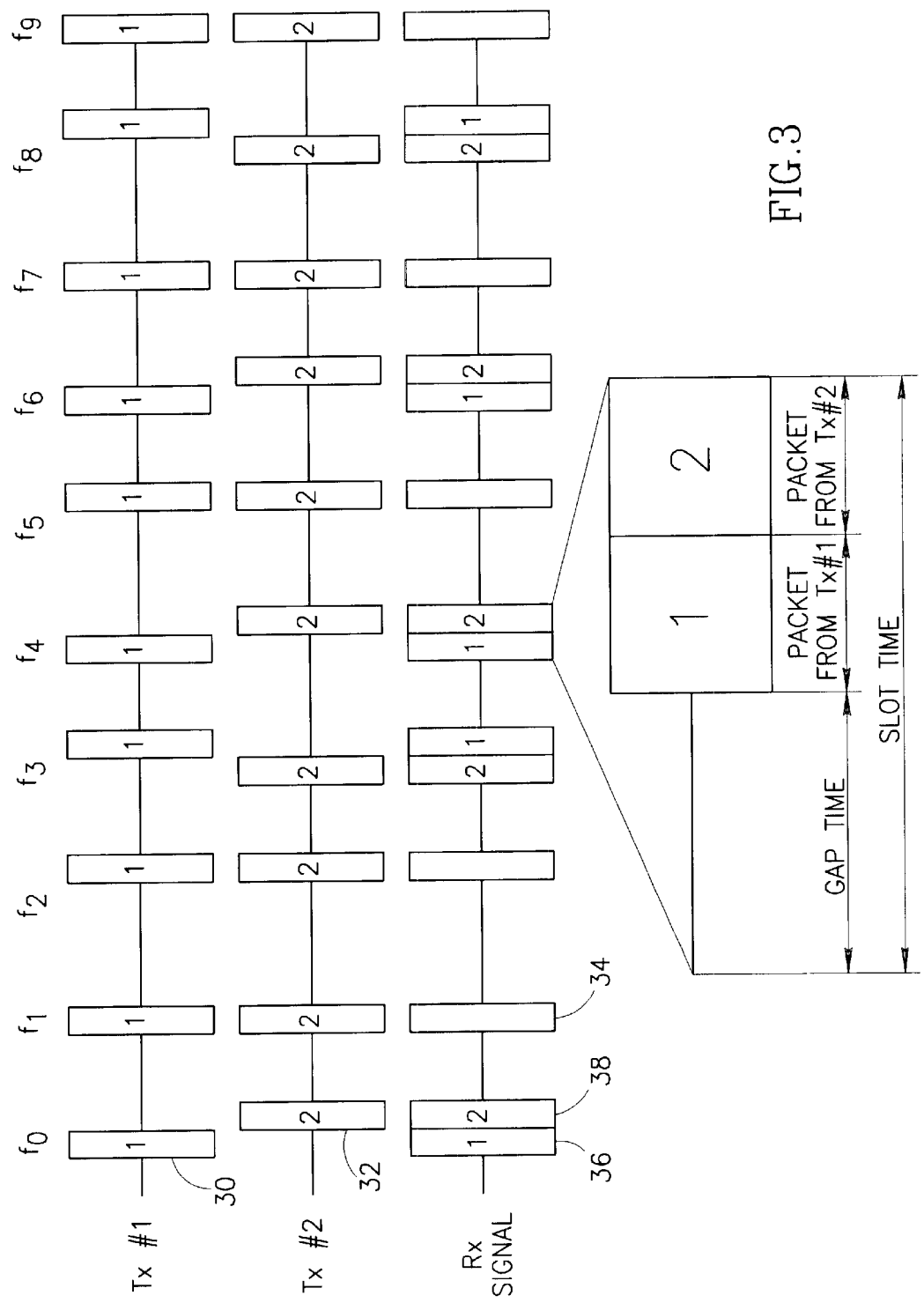
FIG. 3 is a diagram illustrating an example of the output of two transmitters and the subsequent received signal at the receiver wherein the transmitters utilize the collision avoidance method of the present invention.

An illustrative example will now be presented. A diagram illustrating an example of the output of two transmitters and the subsequent received signal at the receiver wherein the transmitters utilize the collision avoidance method of the present invention is shown in FIG. 3. In this example, the communication system is of the frequency hopping spread spectrum type. Two transmitters Tx #1 and Tx #2 begin to transmit a burst at the same time. Tx #1 transmits data packets 30 labeled '1' during each time slot. Similarly, Tx #2 transmits data packets 32 labeled '2' during each time slot. In addition, in this example, ten frequencies, labeled $f_0$ through $f_9$ are used in the hop sequence.

In accordance with the method of the present invention, each transmitter, during each time slot, randomly transmits the data packet during one of the two sub time slots. The same data packet is sent during each time slot and it is highly improbable that all ten time slots will result in a collision causing complete loss of data. The resulting Rx signal as received at the receiver is shown. During the first time slot (frequency $f_0$), both data packets 36, 38 from Tx #1, Tx #2 respectively, are received. During the second time slot (frequency $f_1$), the data packets collide and correct data is received from only one transmitter if one of the received signals is much stronger than the other, or from none of the transmitters if they are received at substantially equal levels. The collisions are represented by the hatched rectangles in FIG. 3.

In this example, out of the ten time slots, collisions occur on five out of the ten total. For this example with ten time slots, the probability Pr that collisions occur during every time slot, and thus cause the complete transmission to be lost, is expressed below in Equation 3.

$$Pr = \left(\frac{1}{2}\right)^{10} \qquad (3)$$
$$= 9.8 \times 10^{-4}$$

This is a relatively low probability. Further, as the number of time slots increases, the resulting probability of complete transmission loss greatly decreases.

It is important to note that the invention is not limited to use in a frequency hopping communication system. In fact, it is irrelevant to the invention whether a frequency hopping scheme is used or not. The data packets may be sent during each time slot using the same or a different frequency. The transmission of the same data packet during a plurality of time slots is, however, crucial to the collision avoidance method of the invention.

In addition, the number of time slots N, which, in the example presented above, also corresponds to the number of different frequencies in the hop sequence, is not fixed and may be any positive integer number. Considering the 900 MHz ISM band as an example, if the signal transmitted is between 1 mW and 250 mW, 25 or more frequencies must be used in the frequency hopping sequence according to the United States Federal Communications Commission (FCC) regulations for unlicensed transmission. The same pseudo random sequence is used for all transmitters in the system. In this example, the same data packet is sent during each time slot. The randomization of each data packet between two sub time slots creates the extremely low probability of collision between two transmitters that begin transmissions at or nearly the same time.

The randomization technique of the present invention is not limited to choosing between one of two sub time slots. Rather, the number of sub time slots, i.e., packet times, may be any integer number M greater than or equal to 2. The higher the number of sub time slots, the greater the degree of collision avoidance provided. This is due to the additional sub time slots that may be chosen during the randomization of transmission times performed each time slot.

Figure 4:
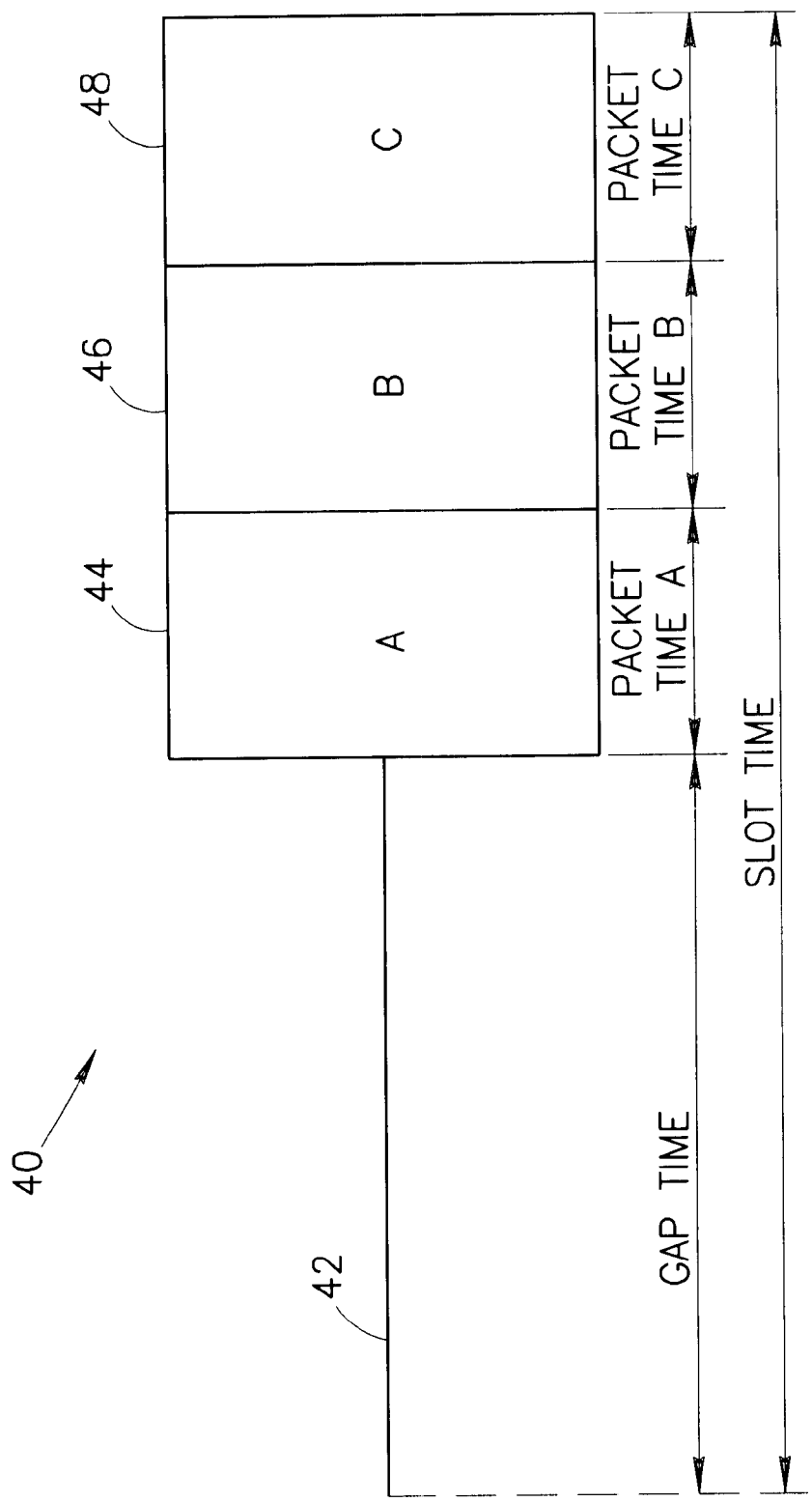
FIG. 4 is a diagram illustrating an alternative time slot in more detail constructed in accordance with the present invention.

A diagram illustrating an alternative time slot in more detail constructed in accordance with the present invention is shown in FIG. 4. The slot time, generally referenced 40, comprises a gap time 42 followed by three packet times or sub slot times 44, 46, 48 labeled A, B, C, respectively. It is possible to express the probability of complete transmission loss due to collision between transmitters. For the case of two transmitters that begin transmitting simultaneously, the probability of compete loss of transmission can be expressed as shown below in Equation 4.

$$Pr = \left(\frac{1}{3}\right)^N \qquad (4)$$

Where N represents the number of time slots used in the burst. The value $\frac{1}{2}$ from Equation 1 has been replaced with $\frac{1}{3}$ in this case due to the addition of a third sub time slot C. During each time slot, each transmitter randomly chooses one of the three sub time slots in which to transmit the data packet. Therefore, the probability of a collision occurring during a single time slot is equal to $\frac{1}{3}$. The expression for the probability of a collision in every time slot is given as above in Equation 4.

Returning to the example of FIG. 3, if three sub time slots are considered, the probability Pr of complete transmission loss with N=10 time slots can be expressed as the following.

$$Pr = \left(\frac{1}{3}\right)^{10} \quad (5)$$
$$= 1.7 \times 10^{-5}$$

Note that this results in a significant improvement over the result of Equation 3 by almost two orders of magnitude. A larger number of sub time slots may be used thus yielding even lower probabilities. A disadvantage, however, of increasing the number of sub time slots is that the length of the time slot and total burst time increases.

What is claimed is:

1. A method of transmitting a message in a communications system comprising a plurality of transmitters and at least one receiver, each said transmitter including means for initiating and transmitting a message to said at least one receiver, said method comprising the steps of:

transmitting said message a predetermined number of times N, each message transmission occurring during a time slot within a burst of N time slots;

dividing each time slot into a plurality of M sub time slots;

randomly selecting one of said M sub time slots in which to transmit said message such that the time delay between successive transmissions during each time slot is random;

transmitting said message during said randomly selected sub time slot;

wherein each transmitter transmits messages asynchronously with respect to and independently of transmissions from all other transmitters;

wherein burst time slot timing for each message is determined independently by each transmitter asynchronous to other transmitters and without the use of any system time slot synchronization; and wherein N and M are positive integers and M is equal to or greater than 2.

2. The method according to claim 1, wherein N is equal to 25.

3. The method according to claim 1, wherein M is equal to 2.

4. The method according to claim 1, further comprising the step of appending a gap time to each time slot.

5. The method according to claim 1, wherein M is equal to 3.

6. The method according to claim 1, wherein said communications system comprises a frequency hopping spread spectrum communications system.

7. The method according to claim 1, wherein said transmitters transmit asynchronously with respect to each other.

8. A method of avoiding collisions between transmission signals in a frequency hopping spread spectrum communications system comprising a plurality of transmitters and at least one receiver, each said transmitter including means for initiating and transmitting a message to said at least one receiver, each transmitter utilizing the same pseudo random hop sequence of N frequencies, said method comprising the steps of:

transmitting each message N times, each message transmission occurring during a different time slot wherein transmissions during each time slot are assigned different frequencies;

dividing each time slot into a plurality of M sub time slots;

randomly selecting one and only one of said M sub time slots in which to transmit said message such that the time delay between successive transmissions during each time slot is random;

transmitting said message during said randomly selected sub time slot;

wherein each transmitter messages asynchronously with respect to and independently of transmissions from all other transmitters;

wherein burst time slot timing for each message is determined independently by each transmitter asynchronous to other transmitters and without the use of any system time slot synchronization; and wherein N and M are positive integers and M is equal to or greater than 2.

9. The method according to claim 8, wherein N is equal to 25.

10. The method according to claim 8, wherein M is equal to 2.

11. The method according to claim 8, further comprising the step of appending a gap time to each time slot.

12. The method according to claim 8, wherein M is equal to 3.

13. The method according to claim 8, wherein said frequencies are assigned in accordance with a pseudo random sequence.

14. The method according to claim 8, wherein said transmitters transmit asynchronously with respect to each other.

15. A communications transmitter, comprising;

means for transmitting a message a predetermined number of times N, each message transmission occurring during a time slot within a burst of N time slots;

means for dividing each time slot into a plurality of M sub time slot;

means for randomly selecting one of said M sub time slots in which to transmit said message such that the time delay between successive transmissions during each time slot is random;

means for transmitting said message during said randomly selected sub time slot;

means for transmitting messages asynchronously with respect to and independently of transmissions from all other transmitters;

means for determining burst time slot timing for each message independently by each transmitter asynchronous to other transmitters and without the use of any system time slot synchronization; and wherein N and M are positive integers and M is equal to or greater than 2.

16. The transmitter according to claim 15, wherein said communications transmitter comprises a frequency hopping spread spectrum transmitter.

* * * * *